United States Patent
Lee et al.

(10) Patent No.: US 10,382,207 B2
(45) Date of Patent: Aug. 13, 2019

(54) IMAGE PROCESSING APPARATUS AND CONTROL METHOD THEREOF

(71) Applicant: SAMSUNG ELECTRONICS CO., LTD., Suwon-si, Gyeonggi-do (KR)

(72) Inventors: Chang-woo Lee, Hwaseong-si (KR); Nam-gwon Lee, Cheonan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 15/479,951

(22) Filed: Apr. 5, 2017

(65) Prior Publication Data

US 2017/0288878 A1 Oct. 5, 2017

(30) Foreign Application Priority Data

Apr. 5, 2016 (KR) .......................... 10-2016-0041778

(51) Int. Cl.
  *H04L 9/32* (2006.01)
  *H04L 9/30* (2006.01)
  *H04L 9/14* (2006.01)

(52) U.S. Cl.
  CPC .............. *H04L 9/3247* (2013.01); *H04L 9/14* (2013.01); *H04L 9/30* (2013.01); *H04L 9/3236* (2013.01)

(58) Field of Classification Search
  CPC ....... H04L 9/3247; H04L 9/3236; H04L 9/30; H04L 9/14
  See application file for complete search history.

(56) References Cited

U.S. PATENT DOCUMENTS

| 7,272,228 | B2 * | 9/2007 | Atkin | G06F 21/52 380/264 |
| 8,782,435 | B1 * | 7/2014 | Ghose | G06F 9/3851 713/190 |
| 2002/0073330 | A1 * | 6/2002 | Chandnani | G06F 21/563 726/26 |
| 2003/0126453 | A1 * | 7/2003 | Glew | G06F 12/126 713/193 |
| 2007/0033419 | A1 * | 2/2007 | Kocher | G06F 21/10 713/193 |

(Continued)

FOREIGN PATENT DOCUMENTS

| KR | 10-2010-0051772 | 5/2010 |
| WO | WO 2009/035283 A2 | 3/2009 |

OTHER PUBLICATIONS

"Operating System Concepts 8th Edition", Silberschatz et al, 2009, pp. 1-971.*

*Primary Examiner* — Robert B Leung
*Assistant Examiner* — Thomas Ho
(74) *Attorney, Agent, or Firm* — Staas & Halsey LLP

(57) ABSTRACT

An image processing apparatus is provided. The image processing apparatus includes a storage configured to store an operating system (OS) of the image processing apparatus, a script file including a program code and a first electronic signature, and an interpreter program provided to execute the program code on the OS; and at least one processor configured to perform an authentication of the first electronic signature with the OS in response to the interpreter program executing the program code on the OS, and selectively permit or block the execution of the program code according to whether the first electronic signature passes or fails to pass the authentication.

20 Claims, 11 Drawing Sheets

(56) References Cited

U.S. PATENT DOCUMENTS

| | | | | |
|---|---|---|---|---|
| 2007/0277037 A1* | 11/2007 | Langer | .................... | G06F 21/54 |
| | | | | 713/176 |
| 2008/0126805 A1* | 5/2008 | Owlett | .................. | H04L 9/3236 |
| | | | | 713/176 |
| 2010/0275026 A1* | 10/2010 | McLean | .................. | G06F 21/12 |
| | | | | 713/176 |

* cited by examiner

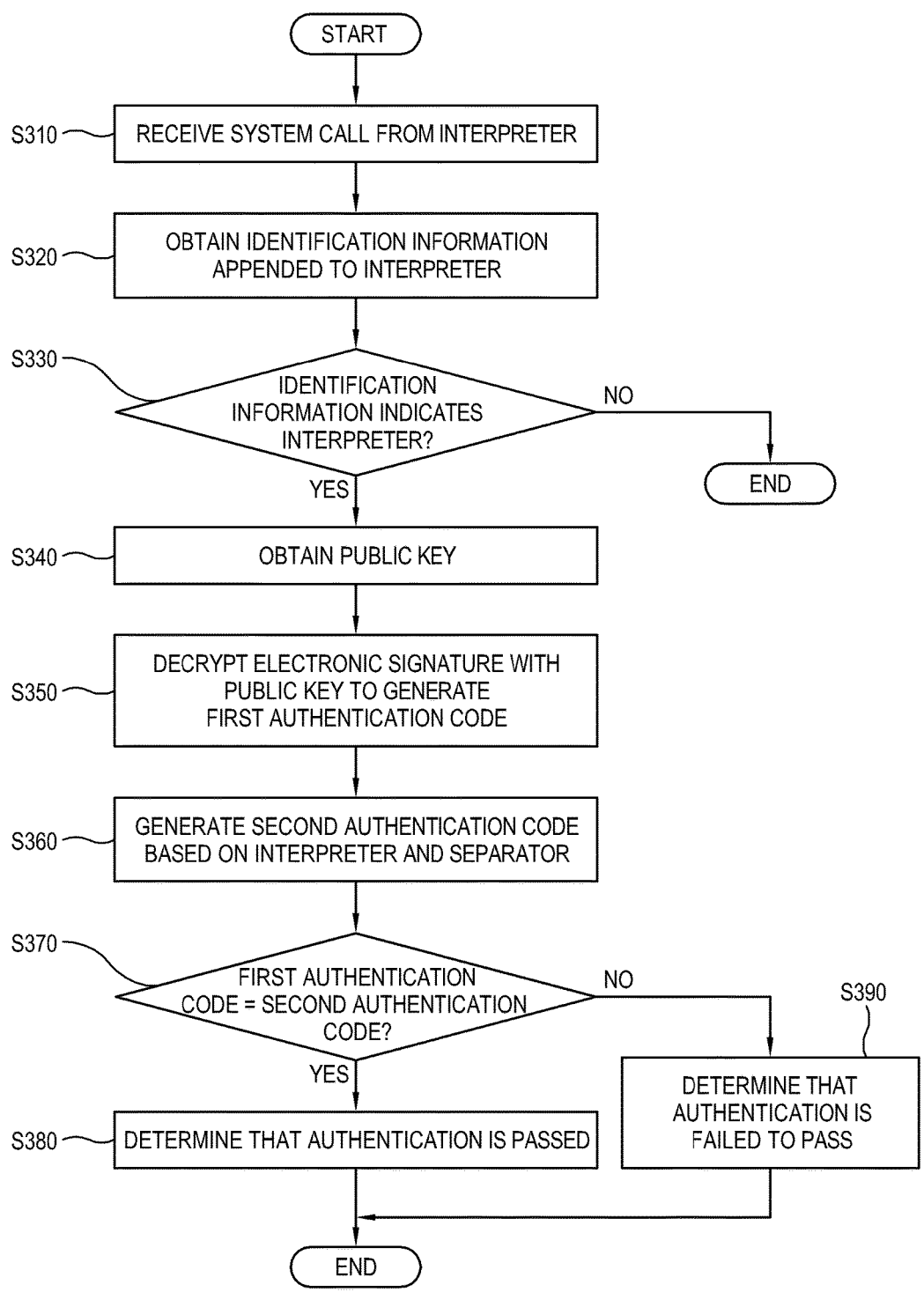

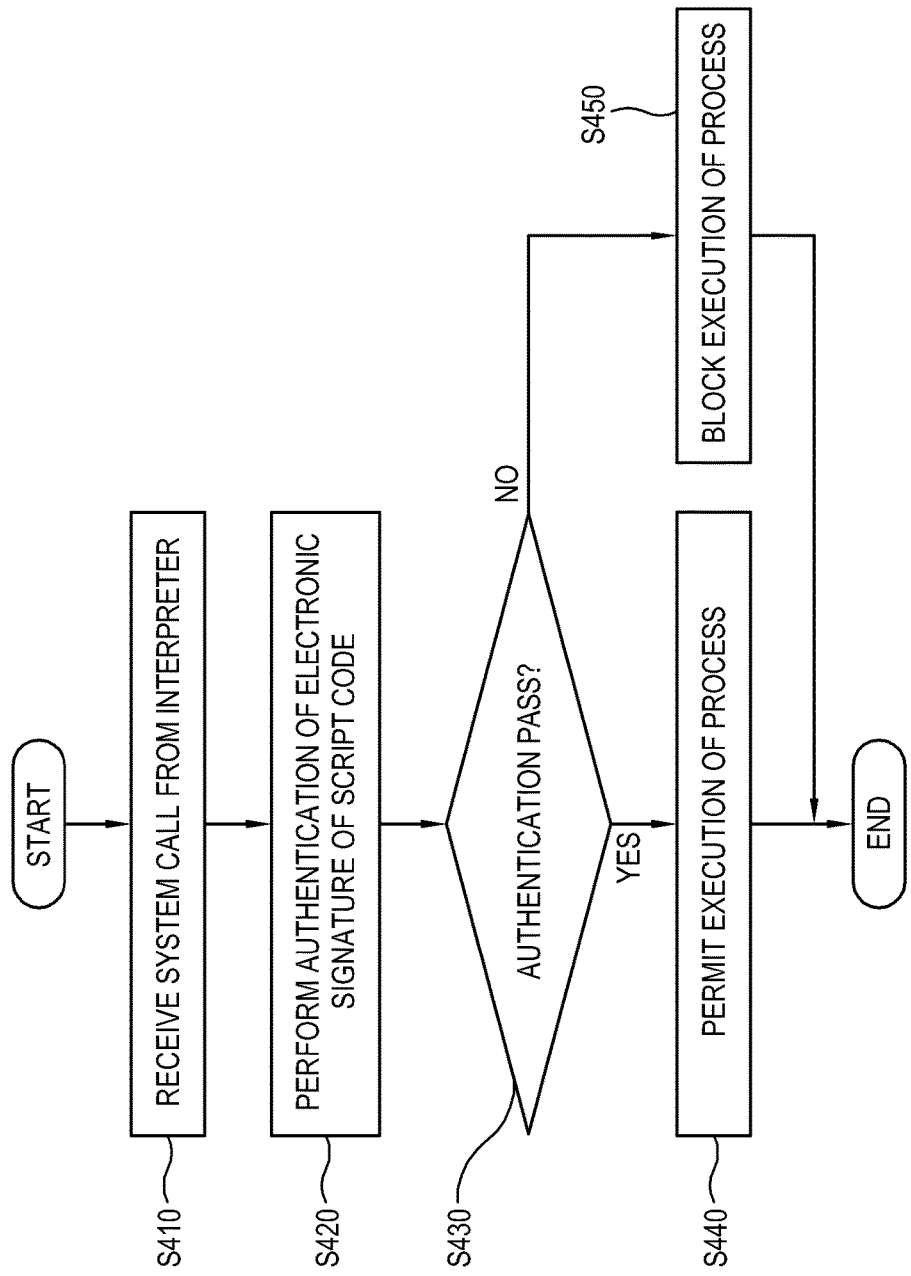

IMAGE PROCESSING APPARATUS AND CONTROL METHOD THEREOF

CROSS-REFERENCE TO RELATED APPLICATION

This application claims priority from Korean Patent Application No. 10-2016-0041778, filed on Apr. 5, 2016 in the Korean Intellectual Property Office, the disclosure of which is incorporated herein in its entirety by reference.

BACKGROUND

Field

Apparatuses and methods consistent with example embodiments relate to an image processing apparatus, which can process various data including image contents and signals, and a control method thereof, and more particularly to an image processing apparatus, which has a structure capable of increasing security for script data executed on an interpreter to prepare for hacking from the exterior, and a control method thereof.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including image data from the exterior, and processes image data extracted from the content signal, in accordance with various image processing processes. The image processing apparatus displays an image based on the processed image data on its own display panel, or outputs the processed image data to another display apparatus provided with a panel so that the corresponding display apparatus can display an image based on the processed image signal. As a typical example of an image processing apparatus, which includes no display panel, there is a set-top box. An image processing apparatus, which includes the display panel, calls especially a display apparatus, and as examples thereof, there are a television (TV), a monitor, a portable multimedia player (PMP), a tablet personal computer, a mobile phone, etc.

The image processing apparatus not only merely processes image data to display an image, but also processes various kinds of applications, data, programs, etc. This processing operation may be contemplated from a viewpoint of software and a viewpoint of hardware. From the viewpoint of software, the image processing apparatus first executes an operating system (OS) at boot time and then executes various data codes on the OS to perform operations or computations instructed by the data codes.

However, the image processing apparatus is variously secured in preparation for hacker's attacks. For the sake of obtaining important data from the image processing apparatus or the like operation, the hacker analyses vulnerable points in a system of the image processing apparatus and attempts to wrest control of the image processing apparatus or the like. As part of such a hacking attack, the hacker alters data code executed in the image processing apparatus, and makes the altered data code execute on the OS of the image processing apparatus. Due to this, the image processing apparatus may leaks data, such as image contents or the like, to the outside or have the system itself damaged.

Accordingly, to prevent such a situation from occurring, a method for increasing security with regard to the data code executed on the OS may be required.

SUMMARY

In accordance with an example aspect of the disclosure, an image processing apparatus is provided, the apparatus including a storage configured to store an operating system (OS) of the image processing apparatus, a script file including a program code and a first electronic signature, and an interpreter program provided to execute the program code on the OS; and at least one processor configured to perform an authentication of the first electronic signature with the OS in response to the interpreter program executing the program code on the OS, and selectively permit or block the execution of the program code according to whether the first electronic signature passes or fails to pass the authentication. Accordingly, when the program code is executed by the interpreter, the image processing apparatus may prevent a normal program code from being replaced by an abnormal program or from being executed in an altered state, thereby increasing its security level.

Here, the first electronic signature may include a code in which the program code is converted based on a predetermined algorithm. The predetermined algorithm may include a hash function. With this, the image processing apparatus may detect whether the program code for executing on the interpreter is in the altered state.

Further, the script file may further include a separator configured to separate the program code and the first electronic signature, and the first electronic signature may include a code in which the program code and the separator are converted based on the predetermined algorithm. According to this, the image processing apparatus may enable the interpreter not to mistake the electronic signature for the program code, and easily detect whether the program code and the separator are in an altered state.

Furthermore, the first electronic signature may be generated by encrypting the code converted based on the predetermined algorithm with a predetermined secret key, and the at least one processor may be configured to process the first electronic signature to decrypt with a public key corresponding to the secret key to perform the authentication. The image processing apparatus therefore may improve the security of the electronic signature.

Here, the at least one processor may be configured to compare a first authentication code generated by decrypting the first electronic signature by the public key with a second authentication code generated by converting the program code based on the predetermined algorithm, and to determine that the first electronic signature passes the authentication in response to the first authentication code being equal to the second authentication code and that the first electronic signature fails to passes the authentication in response to the first authentication code not being equal to the second authentication code. The image processing apparatus thus may easily perform the authentication of the electronic signature.

Also, the at least one processor may be configured to identify the interpreter program form among a plurality of programs executed on the OS, based on identification information appended to the interpreter program. Accordingly, the image processing apparatus may perform the authentication only with regard to a system call generated by the interpreter program form among system calls generated from many native codes, thereby lightening a load of system.

Here, the at least one processor may be configured to perform an authentication of a second electronic signature appended to the identified interpreter program, and to perform the authentication of the first electronic signature in response to the second electronic signature passing the authentication, and block the execution of the program code without performing the authentication of the first electronic signature in response to the second electronic signature failing to pass the authentication. The second electronic signature may include a code in which a code of the interpreter program is converted based on the predetermined algorithm. The predetermined algorithm may include a hash function.

In accordance with another example aspect of the disclosure, a control method of an image processing apparatus is provided, the method including executing an operating system (OS) of the image processing apparatus; by an interpreter, calling a script file including a program code and a first electronic signature to execute the program code on the OS; in response to the interpreter executing the program code, performing an authentication of the first electronic signature by the OS; and selectively permitting or blocking the execution of the program code according to whether the first electronic signature passes or fails to pass the authentication. Accordingly, when the program code is executed by the interpreter, the image processing apparatus may prevent a normal program code from being replaced by an abnormal program or from being executed in an altered state, thereby increasing its security level.

Here, the first electronic signature may include a code in which the program code is converted based on a predetermined algorithm. The predetermined algorithm may include a hash function. With this, the image processing apparatus may detect whether the program code for executing on the interpreter is in the altered state.

Further, the script file may further include a separator configured to separate the program code and the first electronic signature, and the first electronic signature may include a code in which the program code and the separator are converted based on the predetermined algorithm. According to this, the image processing apparatus may enable the interpreter not to mistake the electronic signature for the program code, and easily detect whether the program code and the separator are in an altered state.

Furthermore, the first electronic signature may be generated by encrypting the code converted based on the predetermined algorithm with a predetermined secret key, and the performing may include decrypting the first electronic signature with a public key corresponding to the secret key to perform the authentication. The image processing apparatus therefore may improve the security of the electronic signature.

Here, the performing may include comparing a first authentication code generated by decrypting the first electronic signature by the public key with a second authentication code generated by converting the program code based on the predetermined algorithm, and determining that the first electronic signature passes the authentication in response to the first authentication code being equal to the second authentication code and that the first electronic signature fails to passes the authentication in response to the first authentication code not being equal to the second authentication code. The image processing apparatus thus may easily perform the authentication of the electronic signature.

Also, the performing may include identifying an interpreter program form among a plurality of programs executed on the OS, based on identification information appended to the interpreter program. Accordingly, the image processing apparatus may perform the authentication only with regard to a system call generated by the interpreter program form among system calls generated from many native codes, thereby lightening a load of system.

Here, the performing may further include performing an authentication of a second electronic signature appended to the identified interpreter program, and performing the authentication of the first electronic signature in response to the second electronic signature passing the authentication, and block the execution of the program code without performing the authentication of the first electronic signature in response to the second electronic signature failing to pass the authentication. The second electronic signature may include a code in which a code of the interpreter program is converted based on the predetermined algorithm. The predetermined algorithm may include a hash function.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIG. 10 is a flowchart illustrating a method of authenticating an electronic signature of the interpreter by the kernel of the image processing apparatus according to the first example embodiment; and FIG. 11 is a flowchart illustrating a control method of a kernel of an example image processing apparatus according to a second example embodiment.

DETAILED DESCRIPTION OF EXEMPLARY EMBODIMENTS

Below, example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments will describe only elements directly related to the idea of the disclosure, and description of the other elements will be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Also, the example embodiments described with reference to respective drawings do not have mutually exclusive configurations unless otherwise specifically described, and may be realized as a plurality of example embodiments being selectively combined in one apparatus. Such a combination of the plurality of example embodiments may be arbitrarily selected and applied by those of ordinary skill in the art to realize the scope and spirit of the present disclosure.

Figure 1:
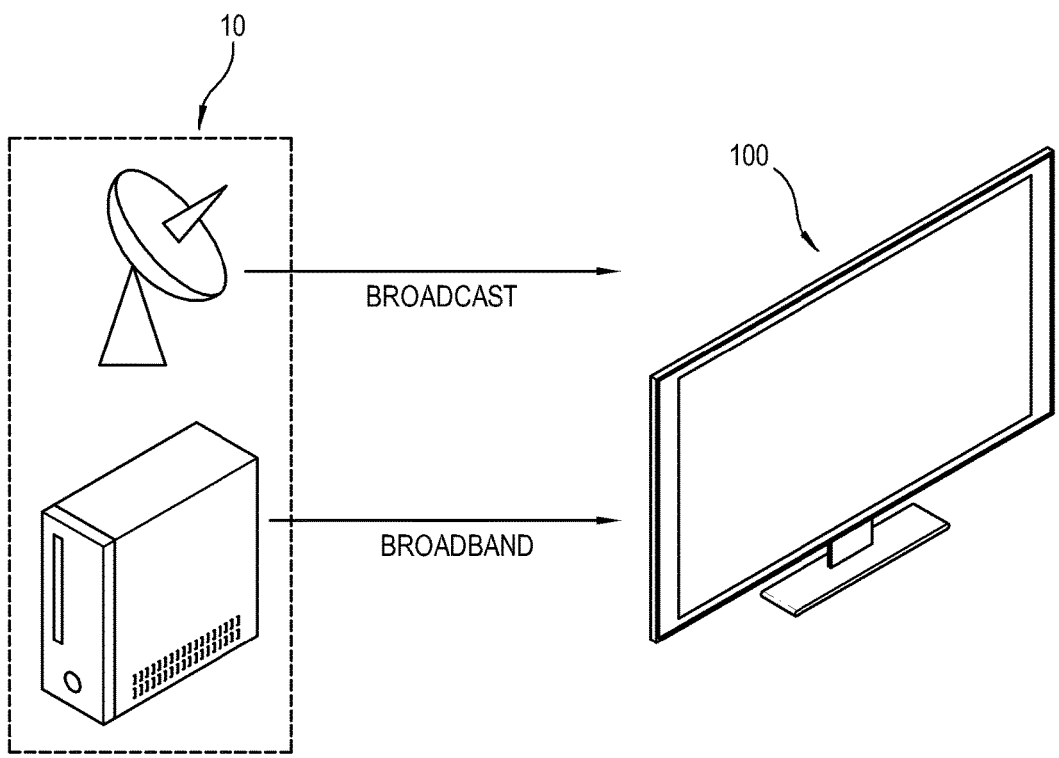
FIG. 1 is a diagram illustrating an example image processing apparatus according to a first example embodiment.

FIG. 1 is a diagram illustrating an example image processing apparatuses 100 according to a first example embodiment.

As illustrated in FIG. 1, the image processing apparatuses 100 according to the first example embodiment receives a content signal from many content sources 10. The content signal may be a broadcast signal including broadcast programs of a plurality of channels, or a data packet including various contents. The image processing apparatuses 100 may be realized as a TV to tune the broadcast signal to display a broadcast program image of specific channel, a set-top box to output the content signal to a separate TV, or a mobile display apparatus, which is not a TV.

A network through which the image processing apparatuses 100 receives the content signal comes in two major types—broadcast and broadband. The image processing apparatuses 100 is therefore realized as a hybrid terminal in which the broadcast network and the broadband network are connected in parallel with each other. The broadband network is a method, which uses a bidirectional IP connection as a frequency band for streaming or downloading A/V content, and the broadcast network is a classical unidirectional transmission method, such as a digital video broadcasting-terrestrial (DVB-T), a DVB-satellite (S), a DVB-cable (C), etc.

The image processing apparatuses 100 may receive a linear A/V content, a non-real-time A/V content, application data, application signaling information, etc. via the broadcast network. Such a connection to the broadcast network allows the image processing apparatuses 100 to receive a broadcast-related application even if the image processing apparatuses 100 is not connected to the broadband network. Additionally, the image processing apparatuses 100 may signal a stream event for application via the broadcast network.

Here, the broadcast-related application refers to an interactive application related to a broadcast TV, a radio or data channel, or contents in such a channel. To the contrary, a broadcast-independent application refers to an interactive applications irrelevant to any broadcast channel or other broadcast data.

Also, the image processing apparatuses 100 may receive application data, a nonlinear A/V content, etc. via the broadband network. Here, the nonlinear A/V content is a content, such as streaming on demand, that a user can freely designate a time for watching the content or a playback point in the content, and the linear A/V content is a push type content that the user can watch the content only in a specific time where the content is provided. Via the broadband network, the image processing apparatuses 100 may communicate with external apparatuses (not shown), which are connected on the same network.

As described above, the image processing apparatuses 100 may receive different types of content data from the content sources 10 via the broadcast network or the broadband network.

Below, a hardware configuration of the image processing apparatuses 100 will be described.

Figure 2:
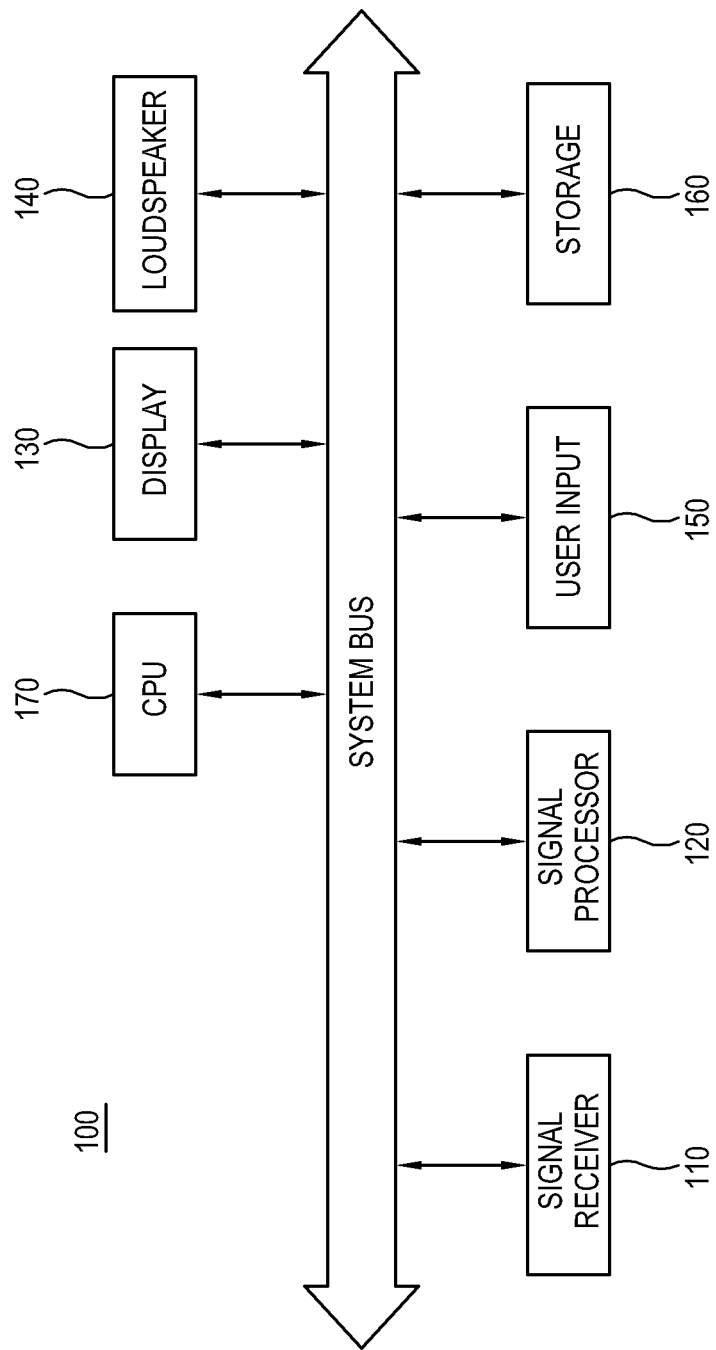
FIG. 2 is a block diagram illustrating the image processing apparatus according to the first example embodiment.

FIG. 2 is a block diagram illustrating the image processing apparatus 100 according to the first example embodiment.

As illustrated in FIG. 2, the image processing apparatus 100 includes a signal receiver 110 to receive a broadcast signal in accordance with the broadcast method or the broadband method, a signal processor 120 to process the broadcast signal received through the signal receiver 110, a display 130 to display a broadcast image of a specific channel of the broadcast signal processed by the signal processor 120, a loudspeaker 140 to output a broadcast sound of the specific channel of the broadcast signal processed by the signal processor 120, a user input 150 to receive an input from a user, a storage 160 to store data, and a central processing unit (CPU) 170 to perform computation for processing of the signal processor 120 and to execute operation control of the image processing apparatus 100. These elements are connected with one another via a system bus.

In the example embodiment, although the CPU 170 is explained as an element separated from the signal processor 120, the CPU 170 may be achieved by a single system on chip (SoC) integrated with the signal processor 120, according to example embodiments.

The signal receiver 110 receives a broadcast signal transmitted in the broadcast method. The signal receiver 110 tunes the broadcast signal with a frequency designated by the CPU 170. For this, the signal receiver 110 includes a tuning chip provided to tune a radio frequency (RF) signal. Also, the signal receiver 110 may receive a broadcast signal transmitted in the broadband method, for example, packet data transmitted from a server (not shown) via an internet. The signal receiver 110 supports at least one of a wired protocol or a wireless protocol. For the former, the signal receiver 110 may include an Ethernet module and for the latter, a wireless communication module. The signal receiver 110 may include both the Ethernet module and the wireless communication module to meet both the wired protocol and the wireless protocol. The wireless communication module may support, for example, a Wi-Fi protocol.

If the broadcast is received, the signal receiver 110, which includes the tuning chip, tunes the broadcast signal with a designated frequency of the specific channel to convert into a transport stream (TS). In other words, the signal receiver 110 converts a high frequency carrier wave into an intermediate frequency band and then converts again the converted carrier wave into a digital signal to generate the TS. For this, the signal receiver 110 may include an A/D converter. According to design methods, the A/D converter may be not included in the signal receiver 110, but in a demodulator (not shown).

The signal processor 120 performs various processes with regard to the broadcast signal received in the signal receiver 110. The signal processor 120 extracts image data of one broadcast channel from the broadcast signal, perform an image processing process with regard to the extracted image data, and outputs the processed image data to the display 130 to display an image thereon.

Since the signal processor 120 is configured to perform many processes in accordance with the kinds or characteristics of signal or data, the processes performable by the signal processor 120 are not limited to the image processing process. Further, data processable by the signal processor 120 are not limited to data received in the signal receiver 110. For example, the signal processor 120 performs an audio processing process with regard to audio data of one broadcast channel extracted from the broadcast signal, and outputs the processed audio data to the loudspeaker 140. Also, if the image processing apparatus 100 receives sounds that the user utters, the signal processor 120 processes the received sounds in accordance with a preset voice recognition processing process. The signal processor 120 is achieved by a SoC in which such various functions are integrated into a single chip, or an image processing board (not shown) in which individual chipsets for independently performing processes are mounted onto a printed circuit board.

The display 130 displays the image data processed by the signal processor 120 as an image. Implementation method of the display 130 is not limited and may include a display panel having a light receiving structure, such as a liquid crystal display (LCD), or a spontaneous light emitting structure, such as an organic light emitting device (OLED). Also, besides the display panel, the display 130 may further include additional elements according to implementation methods of the display panel. For example, if the display 130 is a LCD type, it includes a LCD panel (not shown), a backlight unit (not shown) to supply light to the LCD panel, a panel driving board (not shown) to drive the LCD panel, etc.

The loudspeaker 140 outputs the audio data processed by the signal processor 120 as an audio. The loudspeaker 140 transmits the audio in a principle of changing air pressure by vibrating air according to an audio signal. The loudspeaker 140 includes a unit speaker provided to correspond to audio data of any one audio channel. The loudspeaker 140 may also include a plurality of unit speakers provided to correspond to audio data of a plurality of audio channels, respectively.

The user input 150 transmits various preset control commands or information to the CPU 170 or the signal processor 120 in accordance with user's manipulation or input. In other words, the user input 150 transmits to the CPU 170 or the signal processor 120, various events generated by user's manipulation in accordance with user's intension.

The user input 150 may be variously realized in accordance with methods of inputting information. For example, the user input 150 may include a user interface environment provided on the image processing apparatus 100, such as a key provided on an outer side of the image processing apparatus 100, a touch screen provided on the display 130, a microphone (not shown) for receiving a user's speech sounds, a camera (not shown) for photographing or sensing surroundings of the image processing apparatus 100, etc. A remote controller (not shown) may be also regarded as one configuration of the user interface environment. However, since the remote controller is separated from a main body of the image processing apparatus 100, it transmits a control signal to the image processing apparatus 100 via a separate control signal receiver (not shown) provided in the main body of the image processing apparatus 100.

The storage 160 stores a variety of pieces of data under the process and control of the CPU 170 and the signal processor 120. Thus, the CPU 170 accesses the storage 160 and performs reading, writing, editing, deleting, updating, etc. with regard to the data stored in the storage 160. The storage 160 may be achieved by a flash memory, a hard disc drive, a solid state drive (SSD) or the like non-volatile memory for retaining data regardless of whether the image processing apparatus 100 is turned on or off.

As an example of the data stored in the storage 160, there is a channel map. If the user input any channel number via the user input 150, the CPU 170 retrieves a frequency value corresponding to the input channel number from the channel map stored in the storage 160, and transmits the retrieved frequency value to the signal receiver 110. Thus, the signal receiver 110 may tune the broadcast signal with the frequency value received from the CPU 170.

The CPU 170 is an element for performing central calculation to operate general elements in the signal processor 120, and plays a central role in basically parsing and calculating data. The CPU 170 internally includes a processor register (not shown) in which commands to be processed are stored; an arithmetic logic unit (ALU) (not shown) being in charge of comparison, determination and calculation; a control unit (not shown) for internally controlling the CPU 170 to analyze and carry out the commands; an internal bus (not shown), a cache (not shown), etc.

The CPU 170 performs calculation needed for operating the elements of the signal processor 120. Alternatively, some elements of the signal processor 120 may be designed to operate without the data computation of the CPU 170 or by a separate microcontroller (not shown).

Below, a software configuration for operating the image processing apparatus 100 will be described.

Figure 3:
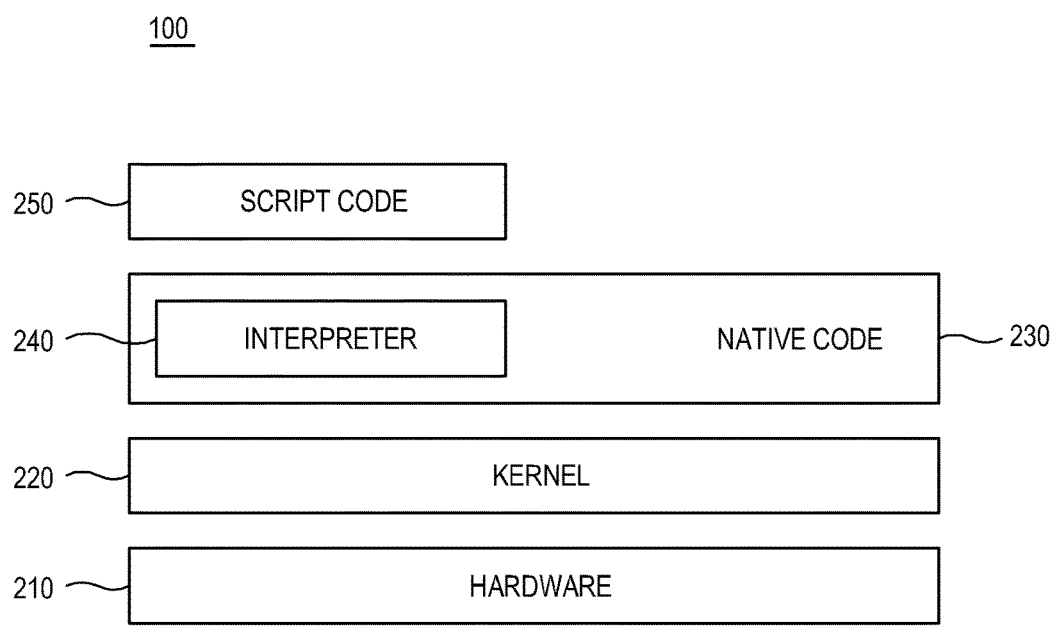
FIG. 3 is a block diagram illustrating a software layer of the image processing apparatus according to the first example embodiment.

FIG. 3 is a block diagram illustrating a software layer of the image processing apparatus 100 according to the first example embodiment.

As illustrated in FIG. 3, the image processing apparatus 100 includes a hardware 210 and a software 220, 230, 240, and 250. To enable the image processing apparatus 100 to operate, the hardware 210 and the software 220, 230 are required to operate in connection with each other. The software 220, 230, 240, and 250 is executed on the hardware 210, and the hardware 210 is driven in accordance with the execution of the software 220, 230, 240, and 250.

The hardware 210 includes elements, such as the signal receiver, the signal processor, the storage, the CPU, etc., as explained with reference to FIG. 2. Since configurations of the hardware 210 can be referred to the above described explanation related to FIG. 2, detailed explanation thereon will be omitted.

The software 220, 230, 240, and 250 is divided into a kernel 220, a native code 230 executed on the kernel 220, and a script code 250 executed on an interpreter 240, which is one of the native code 230. A so-called application is configured including at least one kind from among the script code 250 and the native code 230, and is executed on the kernel 220.

The kernel 220 may be generally defined as an operating system (OS), but to be more exact, a core part of the OS. The OS includes a kernel 220 to play an actual role of the OS, and a shell as a program to provide an interface for implementing various functions and services of the OS. In other words, the kernel 220 is a central body, which defines the OS and which carries out an actual operation of the OS.

The kernel 220 is a system software, which to manage the hardware 210 and to execute the application, provides a hardware abstraction platform and a common system service. The kernel 220 generally has a layer structure located on the hardware 210, but may be executed on a hypervisor (not shown) in accordance with design methods of the image processing apparatus 100. The hypervisor is a logic platform for simultaneously executing a plurality of kernels 220 and is also known as a virtual machine monitor.

The kernel 220 provides abstracting a resource of the hardware 210 to enable an executed application to use the hardware 210. Basically, the kernel 220 plays a role of interface between the application and the hardware 210.

If one application is executed, the kernel 220 assigns various resources of the image processing apparatus 100 including the hardware 210 to generate processes. In a multitasking environment, the kernel 220 establishes a priority with regard to various processes and loads program codes in a memory to execute the corresponding program. The kernel 220 generates, deletes, stops and resumes the processes and provides a mechanism with regard to processing synchronization and communication, and deadlock between the processes.

The native code 230 is a code, which is directly compiled by the kernel 220, and is driven as it is written or created, by the kernel 220. The native code 230 is a code, which is recorded in a language comprehensible by the kernel 220. In other words, to execute the native code 230, there is no need to perform an additional process of translating the native code 230 into the language comprehensible by the kernel 220. Since the native code 230 can be directly executed by the kernel 220, it is located on the kernel 220 at the layer structure.

The interpreter 240 is one kind of the native code 230. Detailed explanation of the interpreter 240 will be described later.

The script code or a managed code 250 is a code executed on the interpreter 240, unlike the native code 230 executable by the kernel 220. The script code 250 may not be directly executed by the kernel 220, and executed by the interpreter 240 for corresponding script code 250. Accordingly, at the layer structure, the script code 250 is located on the interpreter 240. In short, the execution environment of the native code 230 is the kernel 220, whereas the execution environment of the script code 250 is the interpreter 240.

Processes of executing the native code 230 and the script code 250 are compared as described below.

If the kernel 220 of the image processing apparatus 100 receives a system call of instructing an execution of a native code 230 while being executed, the kernel 220 generates a process and calls and executes the native code 230. In this case, to execute the native code 230, the kernel 220 does not perform any additional operation.

On the other hand, if receiving a system call of instructing an execution of a script code 250, the kernel 220 calls and executes an interpreter 240 for executing the script code 250 when generating a process. While the interpreter 240 is executed on the kernel 220, the kernel 220 makes the script code 250 be executed on the interpreter 240.

As described above, the native code 230 does not require the interpreter 240 in execution, whereas the script code 250 requires the interpreter 240 in execution. Below, the reason why the script code 250 requires the interpreter 240 as the execution environment will be described.

Figure 4:
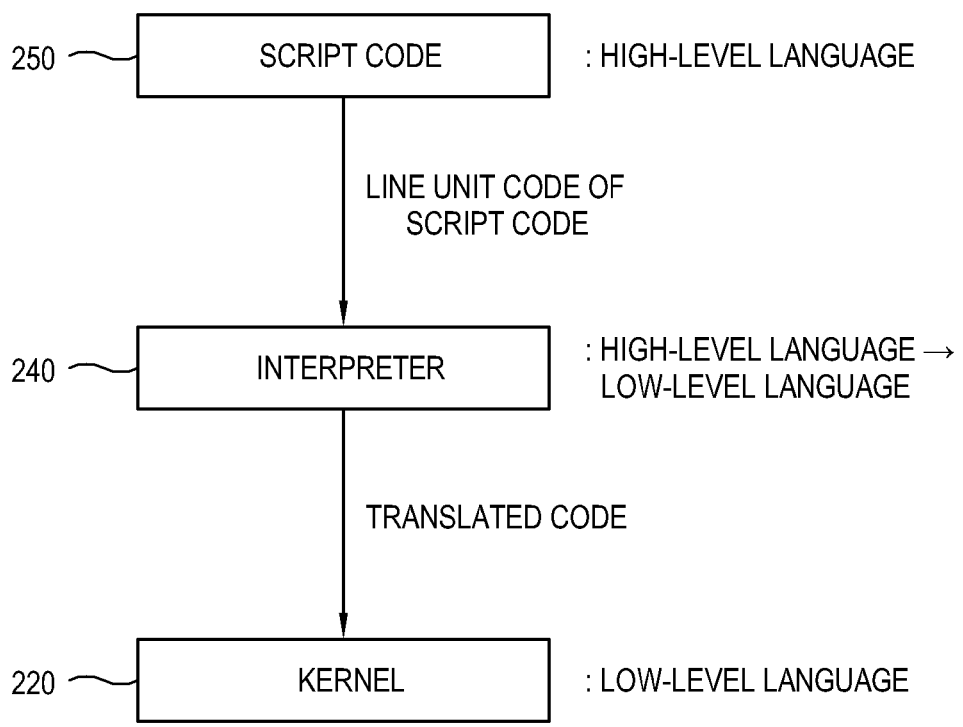
FIG. 4 is a diagram illustrating a process of executing a script code at the image processing apparatus according to the first example embodiment.

FIG. 4 is a diagram illustrating a process of executing the script code 250 at the image processing apparatus according to the first example embodiment.

As illustrated in FIG. 4, to execute one script code 250, the interpreter 240 is first executed on the kernel 220 and the script code 250 is then executed on the interpreter 240.

The interpreter 240 is a native code program, which reads and executes the script code 150 written or created in a high-level programming language of user level, by a preset amount at a time. The interpreter 240, which has the kernel 220 as the execution environment, is a kind of native code. The interpreter 240 reads the script code 250 in a line unit, converts the read line code of the script code 250 into a machine language and transmits the converted line code of the script code 250 to the kernel 220, so that the transmitted line code of the script code 250 is executed by the kernel 220.

A translation program for converting a code of high-level programming language into a code of low-level programming language comes in two types—compiler and interpreter 240. For example, the compiler translates the whole of subject program into the low-level programming language at a time before executing, thereby to output an object program of object language.

On the other hand, since the interpreter 240 executes interpreting the subject program into the low-level programming language step after step, the interpreter 240 does not output the object program, unlike the compiler. Since the interpreter 240 interprets and executes the subject program in a line unit, the interpreter 240 is useful for time sharing systems and responses quick to changes in the original subject program.

Since the script code 250 is created in the high-level programming language and the kernel 220 processes the code of low-level programming language, the kernel 220 can't understand the language of the script code 250. Accordingly, to execute the script code 250, it is necessary for the interpreter 240 to translate the script code 250 into the low-level programming language comprehensible by the kernel 220.

If the subject program is large in size, the time it takes for the compiler to compile and convert the subject program into the object program also becomes longer. The interpreter 240 does not perform such a compiling step, but directly executes one code of the subject program.

If the process is generated and the interpreter 240 is executed on the kernel 220, the script code 250 is translated from the high-level programming language to the low-level programming language by the interpreter 240. The interpreter 240 sends a system call for executing the translated script code 250 to the kernel 220. The kernel 220 executes the translated script code 250.

With such an operation, the script code 250 is executed on the interpreter 140.

Below, a case that a hacker intervenes in the operation as described above will be explained.

Figure 5:
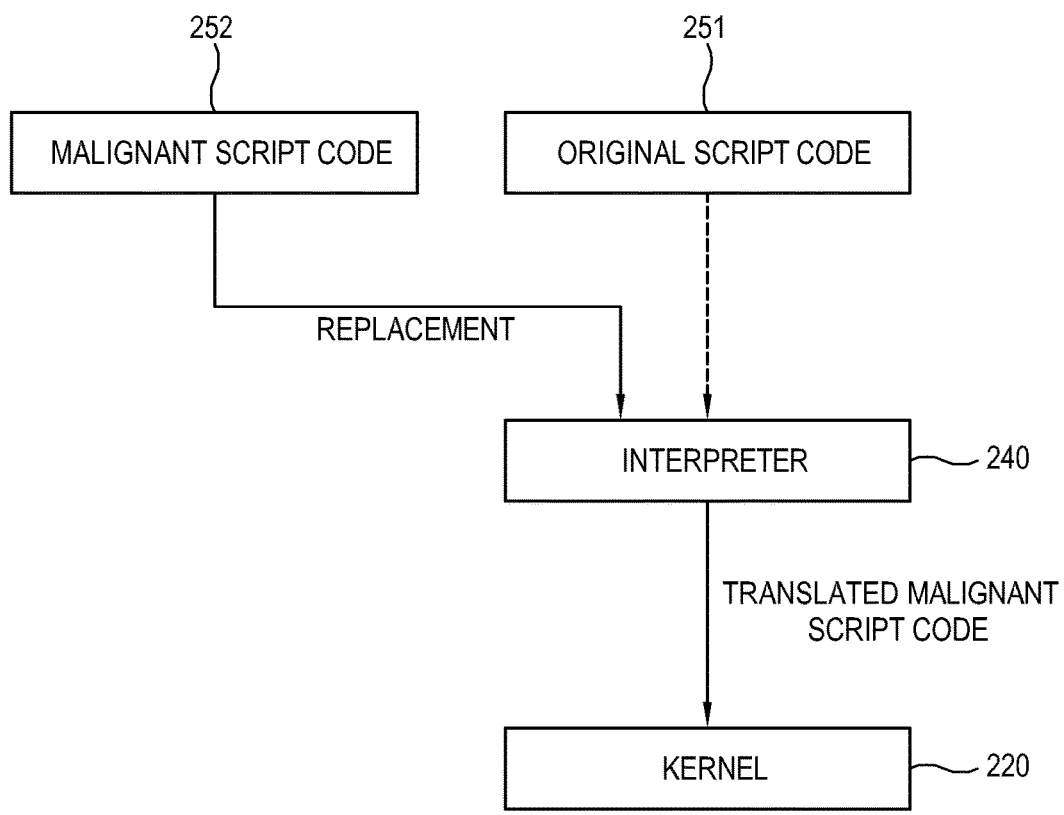
FIG. 5 is a diagram illustrating a principle in which a malignant script code is executed at the image processing apparatus according to the first example embodiment.

FIG. 5 is a diagram illustrating a principle in which a malignant script code 252 is executed at the image processing apparatus according to the first example embodiment.

As illustrated in FIG. 5, the hacker may create the malignant script code 252 including a malignant code, such as a virus or hacking tool, and attempt hacking to involve the malignant script code 252 in a normal process. In the normal process, the interpreter 240 translates an original script code 251 and transmits the translated code of the original script code 251 to the kernel 220 to execute the translated code. With this, operations of the original script code 251 may be executed as it is created.

However, in such a process, the hacker makes the malignant script code 252 instead of the original script code 251 transmit to the interpreter 240. The interpreter 240 translates the malignant script code 252 and transmits the translated code of the malignant script code 252 to the kernel 220 to execute the translated code. With this, operations of the malignant script code 252 instead of the original script code 251 are executed as it is created. Such a result may take many forms. For example, important data in the image processing apparatus may be leaked to the hacker or the hardware of the image processing apparatus may get damaged.

To prevent such problems, the image processing apparatus according to the first example embodiment performs an authentication with regard to the script code. The image processing apparatus executes the script code only if it passes the authentication and blocks the script code if it fails to pass the authentication. Accordingly, the malignant script code 252 may be prevented from being executed instead of the original script code 251.

The authentication to the script code may be performed by the interpreter, but in this case, the interpreter should be modified to include therein an algorithm for the authentication of the script code. However, it is difficult to modify all of interpreters executed on the kernel to include such an algorithm therein.

Accordingly, the image processing apparatus according to the first example embodiment is configured, so that the kernel performs the authentication with regard to the script code and permits an execution by the interpreter only with respect to the script code which passes the authentication.

Below, a method of authenticating the script code by the image processing apparatus according to the first example embodiment will be explained.

Figure 6:
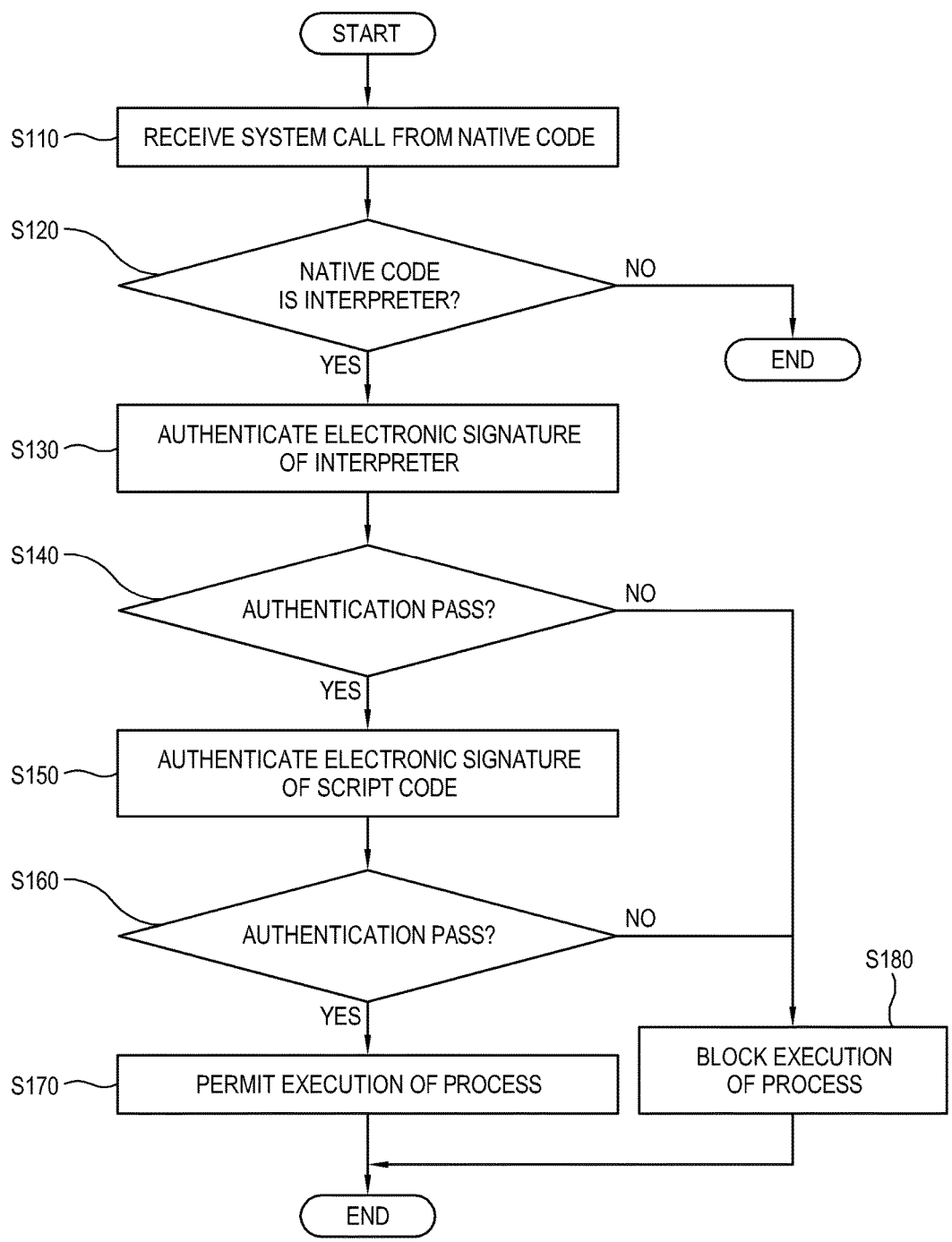
FIG. 6 is a flowchart illustrating a control method of a kernel of the image processing apparatus according to the first example embodiment.

FIG. 6 is a flowchart illustrating a control method of the kernel of the image processing apparatus according to the first example embodiment.

As illustrated in FIG. 6, at an operation S110, the kernel receives a system call from a native code at one process. The system call collectively refers to a general input signal received into the kernel from the native code. Such a system call may be transmitted, for example, from an interpreter by which an execution process of a script code is generated, or from a native code, which is not the interpreter.

At an operation S120, the kernel determines whether the native code is an interpreter. Here, the reason why the kernel determines whether the native code is the interpreter are as follows. The native code executed on the kernel may include a plurality of native codes, and all the plurality of native codes may transmits a system call to the kernel. In this case, performing the authentication with regard to all of the plurality of native codes is burden to system resource. Thus, it is efficient to perform the authentication only with regard to a system call from an interpreter, which is the most needed case. A concrete method of determining whether the native code is the interpreter will be described later.

If it is determined that the kind of the native code is not the interpreter, the kernel does not perform an authentication operation of the process. To the contrary, if it is determined that the kind of the native code is the interpreter, as an operation S130 the kernel authenticates an electronic signature written in the interpreter.

At an operation S140, the kernel determines whether the electronic signature written in the interpreter passes the authentication.

If it is determined that the electronic signature written in the interpreter passes the authentication, at an operation S150 the kernel authenticates an electronic signature of a script code at the process. The script code is designated by the system call.

At an operation S160, the kernel determines whether the electronic signature written in the script code passes the authentication.

If it is determined that the electronic signature of the script code passes the authentication, at an operation S170 the kernel permits an execution of the process, so that the script code is executed on the interpreter.

To the contrary, if it is determined that the electronic signature of the script code fails to pass the authentication, or that at the operation S140 the electronic signature written in the interpreter fails to pass the authentication, at an operation S180 the kernel blocks the execution of the process. There are two cases that the electronic signature of the interpreter or the script code fails to pass the authentication. One is a case that the interpreter or the script code does not include the electronic signature, and the other is a case that the interpreter or the script code includes the electronic signature incapable of passing the authentication.

With this method, the image processing apparatus may prevent the normal script code from being replaced by the malignant script code to execute the replaced malignant script code or from being executed in a state altered by the hacker.

Below, a method of authenticating the script code by the kernel will be explained in detail.

Figure 7:
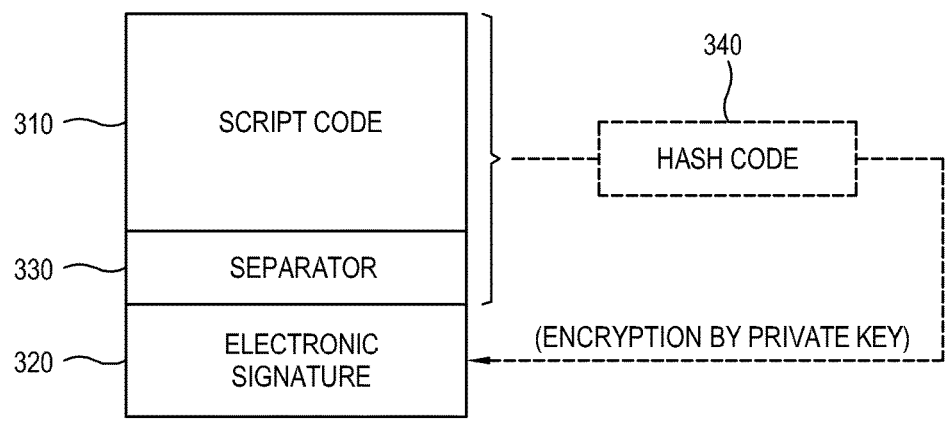
FIG. 7 is a diagram illustrating a package structure of the scrip code applied to the image processing apparatus according to the first example embodiment.

FIG. 7 is a diagram illustrating a package structure of a scrip code 310 applied to the image processing apparatus according to the first example embodiment.

As illustrated in FIG. 7, when creating the script code 310, a developer of the script code 310 adds an electronic signature 320 to the script code 310 to distribute the script code 310 in a package form including the electronic signature 320. In other words, in the related art, only the script code 310 is distributed so that when the script code 310 is executed on the interpreter, only the script code 310 is called by the interpreter. To the contrary, in the example embodiment, the script code 310 is packaged in a set with the corresponding electronic signature 320, so that when the script code 310 is executed on the interpreter, the package of the script code 310 and the electronic signature 320 is called by the interpreter.

When the electronic signature 320 is added to the script code 310, the electronic signature 320 is appended to an end of the script code 310. However, it does not necessarily have to append the electronic signature 320 to the end of the script cord 310 and if codes of the script code 310 and the electronic signature 320 are not mixed, but distinguished from each other, the electronic signature 320 may be also appended to a front or head of the script cord 310.

A separator 330 is inserted and provided between the script code 310 and the electronic signature 320 to enable the electronic signature 320 to be separated from the script code 310. The reason why the separator 330 are needed is as follows. If the interpreter does not identify the script code 310 and the electronic signature 320 when reading the script code 310 in a line unit to process the read line code of the script code 310, the interpreter may determine and process the electronic signature 320 as the script code 310. To the contrary, if the separator 330 is provided to identify the electronic signature 320, the interpreter determines that a code after the separator 330 is not the script code 310, and does not process the code after the separator 330.

The separator 330 may have various forms. For example, the separator 330 may be achieved by an annotation text in accordance with a script grammar. According to the script grammar, the annotation text indicates that codes following the annotation text are not subject codes to be processed. The electronic signature 320 is written subsequent to the annotation text when added to the script code 310, thereby preventing the electronic signature 320 from being recognized and processed as the script code 310 by the interpreter.

Below, a method of cheating the electronic signature 320 will be explained. An object of the electronic signature 320 is to determine that the script code 310 is not altered, but normal, and that the script code 310 is not replaced by other script code.

The developer generates an original code of the electronic signature 320 based on the script code 310 and the separator 330, that is, by converting codes of the script code 310 and the separator 330 in accordance with a predetermined algorithm. The predetermined algorithm comes in various methods. According to the example embodiment, the predetermined algorithm includes a hash function as an example. If the codes of the script code 310 and the separator 330 are converted by the hash function, a hash code 340 is calculated as the original code of the electronic signature 320. A concrete explanation of the hash code 340 will be described later.

Here, the reason why the original code of the electronic signature 320 is not generated based on only the script code 310, but both the script code 310 and the separator 330 is to determine code alteration by the hacker. This is because the hacker may alter the separator 330 as well as the script code 310.

If the hash code 340 is calculated, the developer encrypts the hash code 340 with a private key from among a pair of private key and public key in accordance with an Rivest Shamir Adleman (RSA) encryption mechanism to generate the electronic signature 320. According to the RSA encryption mechanism, a coded message, which is generated encrypting an original text with the private key, may be decrypted into the original text by the public key paired with the private key.

The reason why the encryption by the private key or the public key as described above are required is to prevent the script code 310 from being replaced by the other code by the hacker. Even if an original script code 310 is replaced by a package of a malignant script code and an electronic signature based on the malignant script code, the execution of the malignant script code may be blocked since the electronic signature of the malignant script code is not decrypted by the public key.

As described above, the developer may create and distribute the package of the script code 310 and the electronic signature 320.

Below, the hash function for calculating the hash code 340 will be explained.

The hash function is an algorithm of mapping data having a random length into data having a fixed length. A value derived by the hash function refers to a hash value, a hash code 340, a checksum, etc. The hash function is a deterministic algorithm and thus if two hash value derived from two original data are different from each other, the two original data for the derived two hash value should be also different from each other. The deterministic algorithm refers an algorithm, which is operated as predicted, and thus is an algorithm by which a specific input is always subject to the same process to always output the same result. In other words, if a specific value is input in the hash function, an result value is always the same.

Accordingly, in case of a normal script code 310, a hash value derived from the script code 310 and the separator 330 should be equal to a hash value derived by decrypting the electronic signature 320 with the public key.

On the other hand, after the package of the script code 310 and the electronic signature 320 is distributed, a case that the script code 310 is altered may be considered. Due to the nature of the hash function, a hash value derived from the altered script code 310 and the altered separator 330 becomes different the hash value derived by decrypting the electronic signature 320 with the public key.

In accordance with this respect, the kernel of the image processing apparatus may determine whether the script code 310 is a normal code via the authentication with read to the electronic signature 320 of the script code 310.

Below, a method of authenticating the electronic signature 320 of the script code 310 created as described above, by the kernel of the image processing apparatus will be explained.

Figure 8:
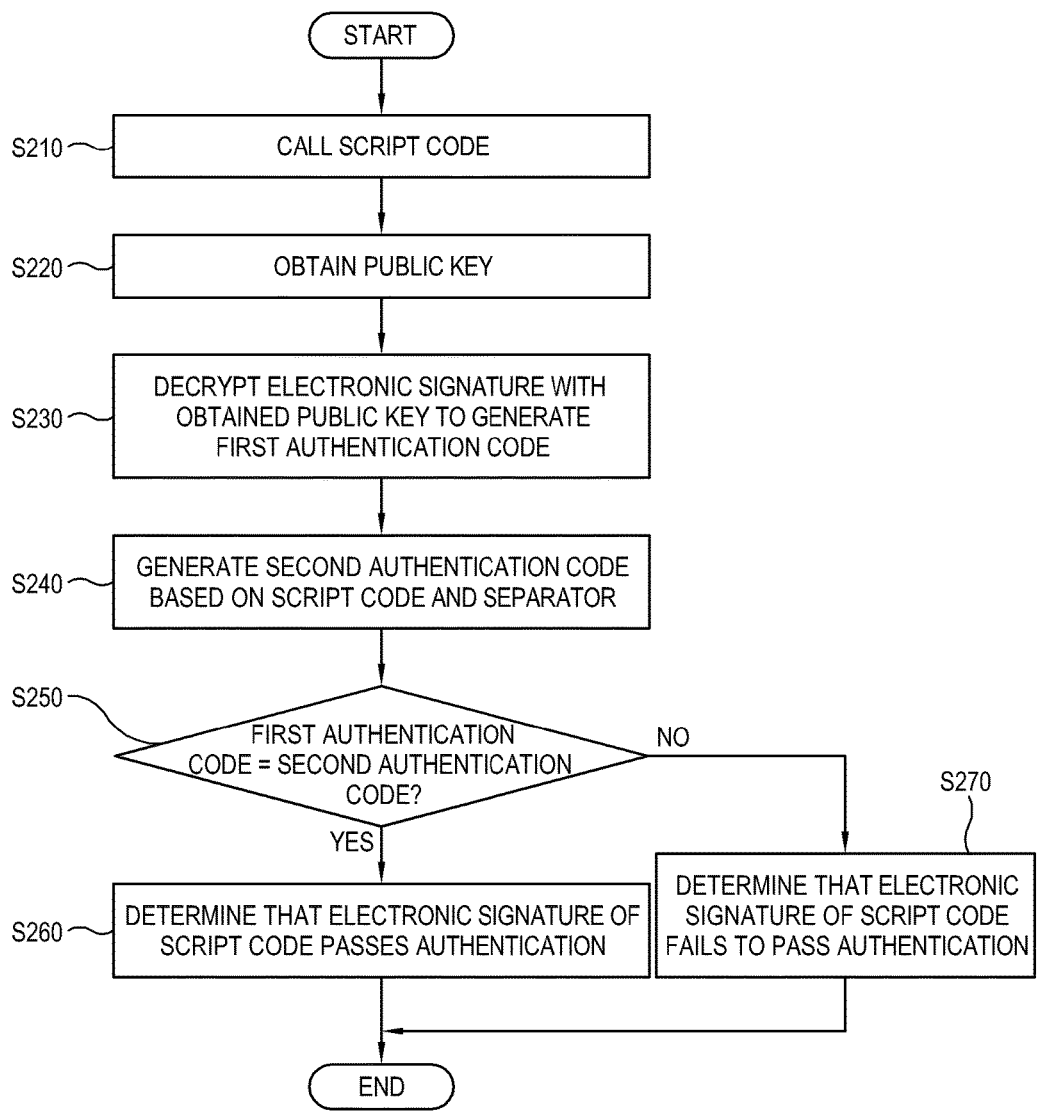
FIG. 8 is a flowchart illustrating a method of authenticating an electronic signature of the script code by the kernel of the image processing apparatus according to the first example embodiment.

FIG. 8 is a flowchart illustrating the method of authenticating the electronic signature of the script code by the kernel of the image processing apparatus according to the first example embodiment.

As illustrated in FIG. 8, at an operation S210, the kernel of the image processing apparatus calls a script code in accordance with a system call from the interpreter. The called script cade is in a state packaged with the electronic signature, as explained above.

At an operation S220, the kernel obtains a public key. Here, the public key is stored in the image processing apparatus in manufacturing. Alternatively, the public key may be received from a predetermined server and stored in the image processing apparatus.

At an operation S230, the kernel decrypts an electronic signature appended to the script code with the obtained public key to generate a first authentication code.

At an operation S240, the kernel generates a second authentication based on the script code and a separator.

At an operation S250, the kernel determines whether first authentication code and the second authentication code are identical.

If it is determined that the first authentication code and the second authentication code are identical, at an operation S260 the kernel determines that the electronic signature of the script code passes the authentication.

If it is determined that the first authentication code and the second authentication code are not identical, at an operation S270 the kernel determines that the electronic signature of the script code fails to pass the authentication.

According to the method as described above, the kernel may authenticate the script code.

Below, a method of authenticating the interpreter by the kernel will be explained. Depending on design methods, the kernel may be also configured not to authenticate the interpreter, but to authenticate only the script code to determine whether the process should be executed. However, in terms of efficiency of system resources of the image processing apparatus, it may be preferable that the kernel performs process authentication only with regard to a system call of the interpreter. In this case, the kernel discriminates the system call from the interpreter from among system calls from the native code and in response to the system call from the interpreter, performs the authentication of the script code to selectively block the execution process of the script code.

Figure 9:
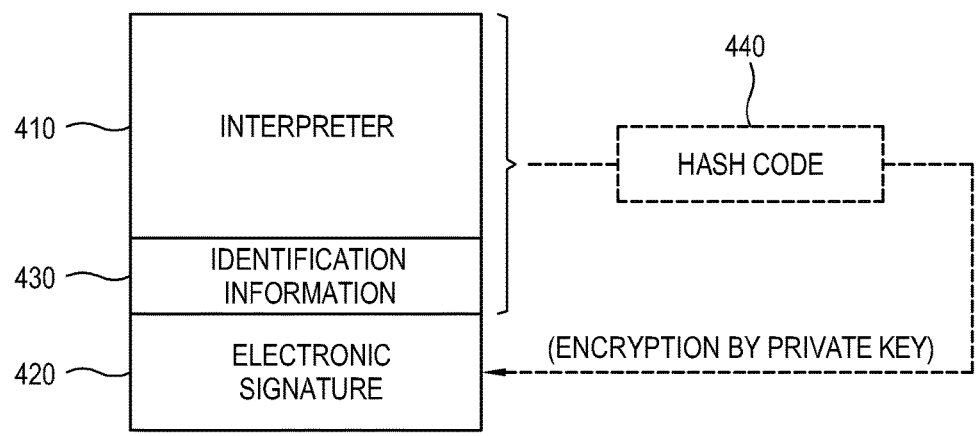
FIG. 9 is a diagram illustrating a package structure of an interpreter applied to the image processing apparatus according to the first example embodiment.

FIG. 9 is a diagram illustrating a package structure of an interpreter 410 applied to the image processing apparatus according to the first example embodiment.

As illustrated in FIG. 9, when writing or creating the interpreter 410, a developer of the interpreter 410 adds an electronic signature 420 and identification information 430 to the interpreter 410 to distribute the interpreter 410 in a package form including the electronic signature 420 and the identification information 430. In the related art, only the interpreter 410 is distributed so that when a process is generated, only the interpreter 410 is called by the kernel. To the contrary, in the example embodiment, the interpreter 410, the identification information 430 and the electronic signature 420 is packaged in a set, and such a package is called by the kernel. Although there is not illustrated in the drawing, similar to the case of the script code, more than one separator for separating or distinguishing interpreter 410, the identification information 430 and the electronic signature 420 from one another may be added to the package.

The identification information 430 is information indicating that a native code of the package is the interpreter 410. When the kernel first calls the package of the interpreter 410, the kernel reads the identification information 430 in the package thereby to determine that the native code in the package is the interpreter 410. In other words, the identification information 430 is flag information indicating that the native code in the package is the interpreter 410 from among many kinds of the native code.

The electronic signature 420 is created in a principle similar to the case of the script code as described above. The electronic signature 420 is for determining whether the interpreter 410 has been altered or replaced.

The developer generates an original code of the electronic signature 420 based on the interpreter 410 and the identification information 430, that is, by converting codes of the interpreter 410 and the identification information 430 in accordance with a predetermined algorithm. The predetermined algorithm comes in various methods, and according to the example embodiment, a hash function equal to that in the case of the script code is used. The developer converts the original code of the electronic signature 420 into a hash code 440 by converting the interpreter 410 and the identification information 430 with the hash function To determine code alteration by the hacker, the developer does not generate the original code of the electronic signature 420 based on only the interpreter 410, but both the interpreter 410 and the identification information 430. This is because it is possible for the hacker to alter the identification information 430 as well as the interpreter 410.

If the hash code 440 is calculated, the developer encrypts the hash code 440 with a private key from among a pair of private key and public key in accordance with the RSA encryption mechanism to generate the electronic signature 420. Here, the pair of private key and public key used to generate the electronic signature 420 of the interpreter 410 may be equal to or different from that used to generate the electronic signature of the script code.

Like the case of the script code, the hash code 440 is encrypted thereby to prevent the replacement of the interpreter 410 by the hacker.

As described above, the developer may create and distribute the package of the interpreter 410, the identification information 430 and the electronic signature 420.

Below, a method of authenticating the electronic signature 420 of the interpreter 410 by the kernel will be explained.

FIG. 10 is a flowchart illustrating a method of authenticating the electronic signature of the interpreter by the kernel of the image processing apparatus according to the first example embodiment.

As illustrated in FIG. 10, at an operation S310, the kernel of the image processing apparatus receives a system call from an interpreter at one process.

At an operation S320, the kernel obtains identification information appended to the interpreter corresponding to the system call. The interpreter is in a state packaged with the identification information and the electronic signature, as described above.

At an operation S330, the kernel determines whether the obtained identification information indicates an interpreter, as described above. If it is determined that the obtained identification information does not indicate the interpreter, the kernel does not perform an additional operation.

To the contrary, if it is determined that the obtained identification information indicates the interpreter, at an operation S340 the kernel obtains a public key. Here, the public key is stored in the image processing apparatus in manufacturing. Alternatively, the public key may be received from a predetermined server and stored in the image processing apparatus.

At an operation S350, the kernel decrypts an electronic signature appended to the interpreter with the obtained public key to generate a first authentication code.

At an operation S360, the kernel generates a second authentication based on the interpreter and the identification information.

At an operation S370, the kernel determines whether the first authentication code and the second authentication code are identical.

If it is determined that the first authentication code and the second authentication code are identical, at an operation S380 the kernel determines that the electronic signature of the interpreter passes the authentication.

If it is determined that the first authentication code and the second authentication code are not identical, at an operation S390 the kernel determines that the electronic signature of the interpreter fails to pass the authentication.

According to the method as described above, the kernel may authenticate the interpreter.

The authentication of the interpreter as described above is applied taking into consideration that performing the authentication with regard to all of the native codes results in unnecessary performance degradation. If there is no need to give a thought to such a performance degradation, the kernel may perform the authentication only with regard to the native codes without considering the authentication with regard to the interpreter.

FIG. 11 is a flowchart illustrating a control method of a kernel of an example image processing apparatus according to a second example embodiment.

As illustrated in FIG. 11, at an operation S410, the kernel receives a system call from an interpreter at one process.

At an operation S420, the kernel authenticates an electronic signature of a script code at the process. The script code is designated by the system call.

At an operation S430, the kernel determines whether the electronic signature written in the script code passes the authentication.

If it is determined that the electronic signature of the script code passes the authentication, at an operation S440 the kernel permits an execution of the process, so that the script code is executed on the interpreter.

To the contrary, if it is determined that the electronic signature of the script code fails to pass the authentication, at an operation S450 the kernel blocks the execution of the process. There are two cases that the electronic signature of the script code fails to pass the authentication. One is a case that the script code does not include the electronic signature, and the other is a case that the script code includes the electronic signature incapable of passing the authentication. Since a concrete method of authenticating the script code would be applied by the above described example embodiment, detailed explanation thereon will be omitted.

With the method as described above, the image processing apparatus may prevent the normal script code from being replaced by the malignant script code to execute the replaced malignant script code or from being altered by the hacker to execute the altered script code.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

While the example embodiments have been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing apparatus, comprising:
   a storage to store an operating system (OS) of the image processing apparatus, a script file including a program code and an electronic signature, and an interpreter program provided to execute the program code on the OS; and
   a processor to execute the OS to:
      evaluate a request for executing the program code of the script file,
      identify whether the program code is to be executed by the interpreter program according to the evaluated request,
      identify whether the electronic signature of the script file is authenticated if the program code is identified to be executed by the interpreter program, and
      execute the interpreter program to interpret the program code into a language available for the OS if the electronic signature of the script file is identified to be authenticated, and execute the interpreted language.

2. The apparatus according to claim 1, wherein the electronic signature includes a code which is generated by converting the program code based on a determined algorithm.

3. The apparatus according to claim 2, wherein the determined algorithm includes a hash function.

4. The apparatus according to claim 1, wherein the script file further includes a separator to separate the program code and the electronic signature, and
   wherein the electronic signature includes a code which is generated by converting the program code and the separator based on a determined algorithm.

5. The apparatus according to claim 2, wherein the electronic signature is generated by encrypting the code with a secret key, and
   wherein the processor decrypts the electronic signature with a public key corresponding to the secret key.

6. The apparatus according to claim 5, wherein the processor:
   compares a first authentication code generated by decrypting the electronic signature with the public key with a second authentication code generated by converting the program code based on the determined algorithm, and
   determines that the electronic signature passes the authentication based on the first authentication code being equal to the second authentication code and that the electronic signature fails the authentication based on the first authentication code not being equal to the second authentication code.

7. The apparatus according to claim 1, wherein the processor identifies the interpreter program from among a plurality of programs executed on the OS, based on identification information appended to the interpreter program.

8. The apparatus according to claim 7, wherein the processor:
   performs an authentication of another electronic signature appended to the identified interpreter program, and
   performs the authentication of the electronic signature based on the other electronic signature passing the authentication, and blocks the execution of the program code without performing the authentication of the electronic signature based on the other electronic signature failing the authentication.

9. The apparatus according to claim 8, wherein the other electronic signature includes another code which is generated by converting an interpreter program code based on another determined algorithm.

10. The apparatus according to claim 9, wherein the other determined algorithm includes a hash function.

11. A control method of an image processing apparatus, the control method comprising:
   storing an operating system (OS) of the image processing apparatus, a script file including a program code and an electronic signature, and an interpreter program provided to execute the program code on the OS;
   evaluating a request for executing the program code of the script file,
   identifying whether the program code is to be executed by the interpreter program according to the evaluated request;
   identifying whether the electronic signature of the script file is authenticated if the program code is identified to be executed by the interpreter program, and
   executing the interpreter program to interpreting the program code into a language available for the OS if the electronic signature of the script file is identified to be authenticated, and executing the interpreted language.

12. The method according to claim 11, wherein the electronic signature includes a code which is generated by converting the program code based on a determined algorithm.

13. The method according to claim 12, wherein the determined algorithm includes a hash function.

14. The method according to claim 11, wherein the script file further includes a separator to separate the program code and the electronic signature, and
    wherein the electronic signature includes a code which is generated by converting the program code and the separator based on a determined algorithm.

15. The method according to claim 12, wherein the electronic signature is generated by encrypting the code with a secret key, and
    wherein the electronic signature is decrypted with a public key corresponding to the secret key.

16. The method according to claim 15, further comprising:
    comparing a first authentication code generated by decrypting the electronic signature with the public key with a second authentication code generated by converting the program code based on the determined algorithm, and
    determining that the electronic signature passes the authentication based on to the first authentication code being equal to the second authentication code and that the electronic signature fails the authentication based on to the first authentication code not being equal to the second authentication code.

17. The method according to claim 11, wherein the identifying whether the program code is to be executed by the interpreter program includes identifying the interpreter program from among a plurality of programs executed on the OS, based on identification information appended to the interpreter program.

18. The method according to claim 17, wherein the identifying the interpreter program includes:
    performing an authentication of another electronic signature appended to the identified interpreter program, and
    performing the authentication of the electronic signature based on the other electronic signature passing the authentication, and blocking the execution of the program code without performing the authentication of the electronic signature based on the other electronic signature failing the authentication.

19. The method according to claim 18, wherein the other electronic signature includes another code which is generated by converting an interpreter program code based on another determined algorithm.

20. The method according to claim 19, wherein the other determined algorithm includes a hash function.

* * * * *